(12) United States Patent
Weng et al.

(10) Patent No.: US 8,019,594 B2
(45) Date of Patent: *Sep. 13, 2011

(54) METHOD AND APPARATUS FOR PROGRESSIVELY SELECTING FEATURES FROM A LARGE FEATURE SPACE IN STATISTICAL MODELING

(75) Inventors: Fuliang Weng, Palo Alto, CA (US); Zhe Feng, Palo Alto, CA (US); Qi Zhang, Shanghai (CN)

(73) Assignee: Robert Bosch Corporation, Broadview, IL (US)

( * ) Notice: Subject to any disclaimer, the term of this patent is extended or adjusted under 35 U.S.C. 154(b) by 1051 days.

This patent is subject to a terminal disclaimer.

(21) Appl. No.: 11/478,990

(22) Filed: Jun. 30, 2006

(65) Prior Publication Data

US 2008/0004865 A1 Jan. 3, 2008

(51) Int. Cl.
*G06F 17/27* (2006.01)
(52) U.S. Cl. ............... 704/9; 704/256; 704/E17.005; 704/E15.013; 704/E15.004; 703/2
(58) Field of Classification Search ............ 704/246, 704/256, 9, E17.005, 15.013, E15.004; 703/2
See application file for complete search history.

(56) References Cited

U.S. PATENT DOCUMENTS

| | | | | |
|---|---|---|---|---|
| 5,832,182 | A * | 11/1998 | Zhang et al. | 706/50 |
| 7,054,810 | B2 * | 5/2006 | Gao et al. | 704/231 |
| 2002/0159642 | A1 * | 10/2002 | Whitney | 382/225 |
| 2004/0249650 | A1 * | 12/2004 | Freedman et al. | 705/1 |
| 2005/0049913 | A1 * | 3/2005 | Huddleston et al. | 705/11 |
| 2006/0287856 | A1 * | 12/2006 | He et al. | 704/256 |

OTHER PUBLICATIONS

Y. Zhou, F. Weng, L. Wu, and H. Schmidt, "A fast algorithm for feature selection in conditional maximum entropy modeling," EMNLP, 2003.*
M. Devaney and A. Ram, Efficient Feature Selection in Conceptual Clustering, Proc. 14th Int'l. Conf. Machine Learning, pp. 92-97, 1997.*
Huan Liu, Lei Yu, Toward Integrating Feature Selection Algorithms for Classification and Clustering, IEEE Transactions on Knowledge and Data Engineering, v.17 n.4, p. 491-502, Apr. 2005.*

(Continued)

*Primary Examiner* — Richemond Dorvil
*Assistant Examiner* — Greg Borsetti
(74) *Attorney, Agent, or Firm* — Dergosits & Noah LLP; Geoffrey T. Staniford

(57) ABSTRACT

Embodiments of a progressive feature selection method that selects features in multiple rounds are described. In one embodiment, the progressive feature selection method splits the feature space into tractable sub-spaces such that a feature selection algorithm can be performed on each sub-space. In a merge-split operation, the subset of features that the feature selection algorithm selects from the different sub-spaces are merged into subsequent sets of features. Instead of re-generating the mapping table for each subsequent set from scratch, a new mapping table from the previous round's tables is created by collecting those entries that correspond to the selected features. The feature selection method is then performed again on each of the subsequent feature sets and new features are selected from each of these feature sets. This feature selection-merge-split process is repeated on successively smaller numbers of feature sets until a single final set of features is selected.

17 Claims, 7 Drawing Sheets

OTHER PUBLICATIONS

Shaul Markovitch, Dan Rosenstein, Feature Generation Using General Constructor Functions, Machine Learning, v.49 n. 1, p. 59-98, Oct. 2002.*

Law et al. "Simultaneous Feature Selection and Clustering Using Mixture Models" 2004.*

Riezler et al. "Incremental Feature Selection and L1 Regularization for Relaxed Maximum-Entropy Modeling" 2004.*

* cited by examiner

400

| CATEGORIES | VARIABLE NAME | DESCRIPTION |
|---|---|---|
| Words | $W_0$ | The current orthographic word. |
| | $W_{-5}, \ldots, W_{-1}, W_{+1}, \ldots, W_{+5}$ | Words for the left 5 positions and right 5 positions. |
| | $C_w$ | The first non-punctuation word to the right of the current position |
| POS Tags | $T_{-5}, \ldots, T_{+5}$ | POS tags at current position and left/right 5 positions |
| | $C_t$ | The first POS Tag to the right of the current position |
| Partial Word Flags | $P_{-3}, \ldots, P_{+3}$ | Partial word flags at current position and left/right 3 positions |
| Hierarchical POS Tags (HTag) | $HT_{-5}, \ldots, HT_{+5}$ | Hierarchical POS tags at current position and left/right 5 positions |
| Hierarchical POS Rough Copy | $N_m$ | Number of words in common in reparandum and repair |
| | $N_n$ | Number of words in reparandum but not repair |
| | $N_i$ | Number of words in interregnum |
| | $N_l$ | Number of words to the left edge of reparandum |
| | $N_r$ | Number of words to the right edge of reparandum |
| | $T_i$ | The tag of the first word right after the interregnum that is right after the current word. |
| Word Rough Copy | $WN_m$ | Number of words in common in reparandum and repair |
| | $WN_i$ | Number of words in interregnum |
| | $WN_l$ | Number of words to the left edge of reparandum |
| | $WN_r$ | Number of words to the right edge of reparandum |
| Distance | $D_{INTJ}$ | Distance to the nearest INTJ |
| | $D_W$ | Distance to the nearest same word |
| | $D_{Bigram}$ | Distance to the nearest same bi-gram |
| | $D_{Trigram}$ | Distance to the nearest same tri-gram |
| Prosody Information | $PL_0, \ldots, PL_3$ | Prosody label with largest post possibility at current position and right 3 positions |
| | $PC_0, \ldots, PC_3$ | Prosody confidence at current position and right 3 positions |

| Categories (Space Code) | Short Description | # of combos |
|---|---|---|
| Hierarchical POS Tags Combination (HTagComb) | $HT_i\_HT_j$, i, j belongs to $\{-5, ..., +5\}$ and $i < j$ | 55 |
| Word / POS Tags Combination (W/TComb) | $W_i\_W_j$,  i, j belong to $\{-5, ..., +5\}$ and $i < j$<br>$W_0\_T_i$,  i belong to $\{-5, ..., +5\}$<br>$T_i\_T_j$,  i, j belong to $\{-5, ..., +5\}$ and $i < j$<br>$T_i\_W_j$,  i, j belong to $\{-5, ..., +5\}$ and $j \neq 0$ | 55<br>11<br>55<br>110 |
| Rough Copy Combination (RCComb) | $R_i\_R_j$,   $R_i$ and $R_j$ belong to $\{ N_m, N_n, N_i, N_l, N_r, T_i, D_{INTJ}, WN_m, WN_i, WN_l, WN_r\}$<br>$R_i \neq R_j$ and let $R_i\_R_j = R_j\_R_i$ | 55 |
| Prosody Combination (PComb) | $PL_i\_PL_j$,           i, j belong to $\{0, ..., 3\}$ and $i < j$<br>$PL_i\_PC_i$,           i belongs to $\{0, ..., 3\}$<br>$PL_i\_PC_i\_PL_j\_PC_j$, i, j belong to $\{0, ..., 3\}$ and $i < j$<br>$W_i\_PL_i$,              i belongs to $\{0, ..., 3\}$<br>$W_i\_PL_i\_PC_i$,       i belongs to $\{0, ..., 3\}$<br>$W_i\_PL_i\_W_j\_PL_j$,  i, j belong to $\{0, ..., 3\}$ and $i < j$<br>$W_i\_PL_i\_PC_i\_W_j\_PL_j\_PC_j$,   i, j belong to $\{0, ..., 3\}$ and $i < j$ | 6<br>4<br>6<br>4<br>4<br>6<br>6 |

| CATEGORY | FEATURES |
|---|---|
| Words | $W_{-5}, \ldots, W_{+5}, C_w$ |
| | $D_{INTJ}, D_W, D_{Bigram}, D_{Trigram},$ |
| | $P_{-3}, \ldots, P_{+3}$ |
| | $W_i\_W_j$ |
| POS Tags | $T_{-5}, \ldots, T_{+5}, C_t$ |
| | $W_0\_T_i, T_i\_T_j, T_i\_W_j$ |
| | $HT_{-5}, \ldots, HT_{+5}$ |
| | Hierarchical POS Tags Combinations |
| Rough Copy | $N_m, N_n, N_i, N_l, N_r, T_f$ |
| | $WN_m, WN_i, WN_l, WN_r$ |
| | Rough Copy Combinations |
| Prosody | $PL_0, \ldots, PL_3, PC_0, \ldots, PC_3$ |
| | Prosody Combinations |

FIGURE 6

METHOD AND APPARATUS FOR PROGRESSIVELY SELECTING FEATURES FROM A LARGE FEATURE SPACE IN STATISTICAL MODELING

CROSS-REFERENCE TO RELATED APPLICATIONS

The current application is related to U.S. Patent Application entitled "Method and Apparatus for Generating Features Through Logical and Functional Operations" filed on Jun. 30, 2006.

FIELD

Embodiments of the invention relate generally to statistical modeling and specifically to selecting features from a very large feature space.

BACKGROUND

Machine learning applications, such as natural language processing systems, typically involve the analysis of data that is both noisy and of complex relational structure. Statistical techniques are often employed to model the data being analyzed. A primary step in statistical modeling is to select a useful subset of features with proper weights from a feature space.

Recent developments in statistical modeling of various linguistic phenomena have shown that increasing the feature spaces generally gives consistent performance improvements. Such improvements are often limited by the number of features a system is able to explore. With respect to applications, such as natural language processing, image processing, bioinformatics, transaction predictions, business process, predictive processing, and so on, Conditional Maximum Entropy (CME) modeling has become a well established technique of statistical classification. One advantage of CME modeling is the ability to incorporate a variety of features in a uniform framework with a sound mathematical foundation.

Various feature selection techniques have been developed to greatly speed up the feature selection process. One such method is the Selective Gain Computation (SGC) method, as described in U.S. Patent Application 20050021317, which is assigned to the assignees of the present invention, and which is hereby incorporated in its entirety by reference. However, like many other statistical modeling algorithms, such as boosting and support vector machine techniques, the SGC algorithm is generally limited by the size of the defined feature spaces. Because larger feature spaces tend to give better results, it is advantageous to include an unlimited amount of features. Present techniques, however, are limited with respect to the size of the feature spaces they can handle. What is needed, therefore, is a feature selection method that overcomes the feature space size limitation of present statistical modeling systems.

BRIEF DESCRIPTION OF THE DRAWINGS

Embodiments of the present invention are illustrated by way of example and not limitation in the figures of the accompanying drawings, in which like references indicate similar elements and in which:

FIG. 4 is a table that lists a number of possible variables used in a natural language processing system that utilizes a PFS method, under an embodiment.

FIG. 5 is a table that lists a number of possible variable combinations for the variables of FIG. 4, under an embodiment.

FIG. 6 is a table that illustrates possible dimensions for an example of a disfluency detection system, under an embodiment.

DETAILED DESCRIPTION

Embodiments of a progressive feature selection component for use in machine learning applications utilizing statistical modeling systems are described. In one embodiment, the feature selection component helps generate a model based on training data by acting on ultra large feature spaces.

Current statistical modeling methods are only applicable to limited sizes of feature spaces, which restricts the performance they may reach. Embodiments of the present invention provide new methods that enable a virtually unlimited size of feature spaces. Experiments on disfluency detection (also called disfluency region detection or edit region detection) show that the implemented new methods are able to process tens of millions of features and as a result of that more than significant improvements have been observed. Embodiments are directed to a progressive feature selection (PFS) method that selects features in multiple rounds of feature subset selection and merge (combination) steps. The PFS method splits the feature space into tractable sub-spaces such that the SGC algorithm or similar feature selection method can be performed on each one of them. In the merge (combination) round, the features that the SGC step selects from different sub-spaces are merged (combined) into groups. Instead of re-generating the mapping table for each group from scratch, a new mapping table from the previous round's tables is created by collecting those entries that correspond to the selected features. Then, the SGC algorithm is performed on each of the feature groups and new features are selected from each of them. This process is repeated until a single final set of feature is selected. The new methods are applicable to various statistical modeling methods, such as boosting, maximum entropy modeling, and the like.

In the following description, numerous specific details are introduced to provide a thorough understanding of, and enabling description for, embodiments of the progressive feature selection method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
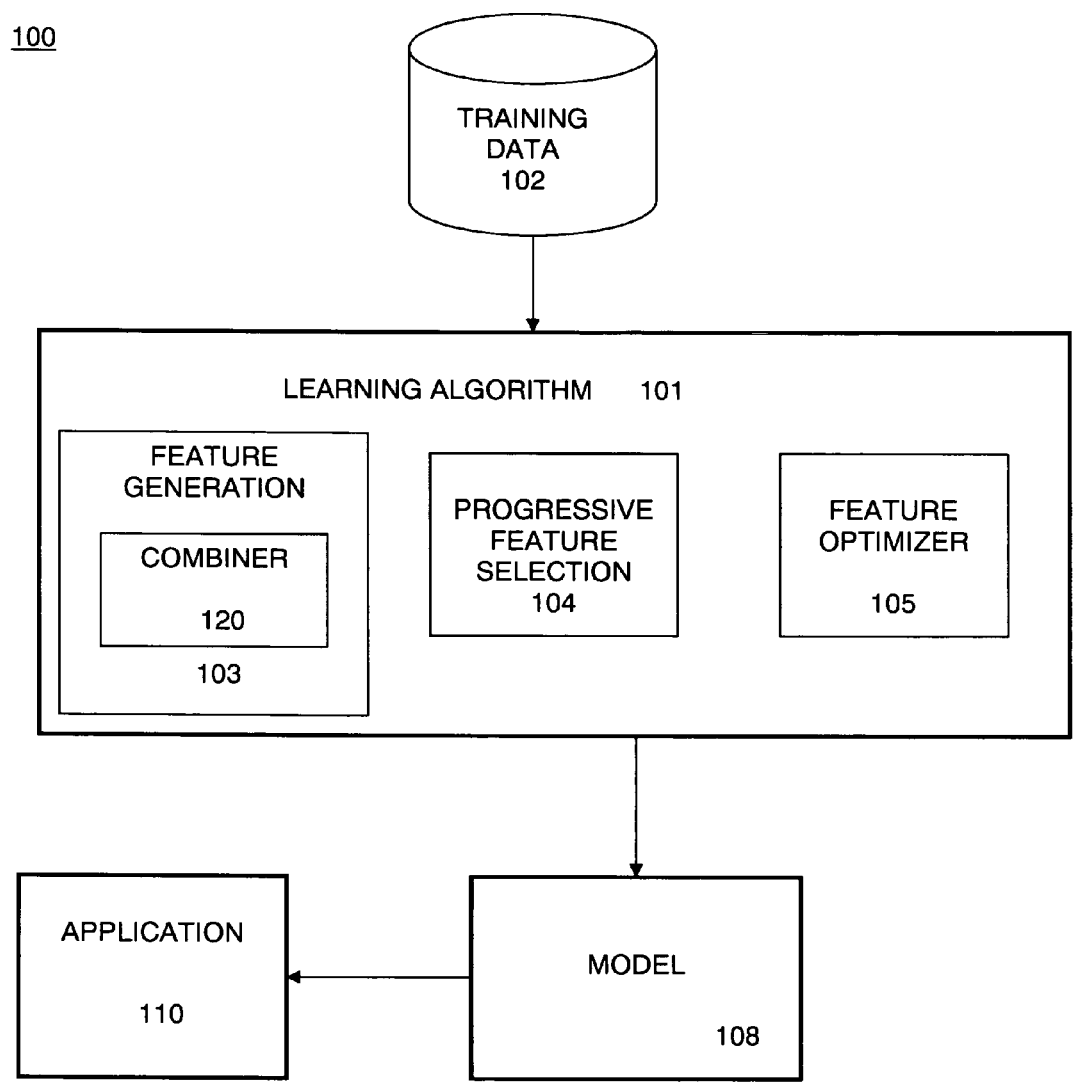
FIG. 1 is a block diagram of a machine learning system including a progressive feature selection component, according to an embodiment.

FIG. 1 is a block diagram of a machine learning system for a system that includes progressive feature selection process, according to an embodiment. System 100 illustrated in generally provides a learning algorithm 101 that learns a model 108 based on training data 102. The model 108 is then used by application 110 to generate results based on input data that may or may not be the same as the training data. Some applications, such as natural language processing systems, usually need to explore ultra-large feature spaces generated from training data 102. Feature selection is typically a difficult, yet critical task when the feature space under investigation is large. In general, this task involves finding a best subset of features from a collection of all possible feature subsets.

In one embodiment, the learning algorithm contains a feature generation module 103 that generates the features from the training data 102. For implementations described herein, it is assumed that the feature spaces generated by feature generation module 103 are ultra-large feature spaces, such as on the order of tens to hundreds of millions of features, or more. The feature set is processed by progressive feature selection process 104. The progressive feature selection process 104 allows the processing of ultra large feature sets, e.g., on the order of millions to billions of features, by utilizing an iterative splitting, and merging process to reduce the initial feature space to a final feature set through successive selection steps. The final feature set can then be optimized through a feature optimizer 105 prior to generation of model 108.

System 100 can be implemented in a distributed computing system comprising a number of computers or workstations coupled together over a network. Alternatively, the functional blocks of system 100 can be implemented in a single computer that represents a unitary dialog system, or in any type of device, such as appliances, machinery, and other type of computer-controlled or automated apparatus.

The application 110 that makes use of model 108 resulting from the progressive feature selection process 104 can be any type of application, such as natural language processing, speech recognition, image processing, bioinformatics, transaction predictions, business process, predictive processing (e.g., weather, stock market, disaster, etc.), and any other similar statistical modeling application.

With respect to a particular type of application, Conditional Maximum Entropy (CME) modeling has received a great amount of attention within natural language processing community for the past decade. One of the main advantages of CME modeling is the ability to incorporate a variety of features in a uniform framework with a sound mathematical foundation. There are two main tasks in CME modeling: the feature selection process that chooses from a feature space a subset of good features to be included in the model; and the parameter estimation process that estimates the weighting factors for each selected feature in the exponential model. Embodiments described herein are directed to the feature selection process in CME modeling.

Recent improvements on the original incremental feature selection (IFS) algorithm of CME modeling have accelerated the feature selection process. However, like many other statistical modeling algorithms, such as boosting and support vector machine, the CME algorithm is limited by the size of defined feature spaces. Past results show that larger feature spaces tend to give better results. However, finding a way to include an unlimited amount of features remains a significant challenge.

Selective Gain Computation

Embodiments are directed to a novel progressive feature selection (PFS) method that addresses the feature space size limitation in present CME methods. In general, the principles behind PFS can be used with any machine learning algorithm. In one embodiment, the PFS method utilizes the Selective Gain Computation (SGC) algorithm, which is described in U.S. Patent Application 20050021317, for selection of feature subsets. Generally, the SGC algorithm offers fast training and high quality models, which is important to conduct large scale experiments. When used in conjunction with the iterative PFS method, this new technique is able to explore a virtually unlimited amount of features.

By way of background, the goal of CME is to find the most uniform conditional distribution of y given observation x, p(y|x), subject to constraints specified by a set of features $f_i(x,y)$, where features typically take the value of either 0 or 1.

More precisely, we want to maximize $$H(p) = -\sum_{x,y} \tilde{p}(x)p(y|x)\log(p(y|x)) \qquad (1)$$

given the constraints: $E(f_i) = \tilde{E}(f_i)$
where $$\tilde{E}(f_i) = \sum_{x,y} \tilde{p}(x,y)f_i(x,y)$$

is the empirical expected feature count from the training data and $$E(f_i) = \sum_{x,y} \tilde{p}(x)p(y|x)f_i(x,y)$$

is the feature expectation from the conditional model p(y|x).
This results in the following exponential model:

$$p(y|x) = \frac{1}{Z(x)}\exp\left(\sum_j \lambda_j f_j(x,y)\right)$$

where $\lambda_j$ is the weight corresponding to the feature $f_j$, and Z(x) is a normalization factor.

In the traditional Incremental Feature Selection (IFS) algorithm, training starts with a uniform distribution over all values of y and an empty feature set. For each candidate feature in a predefined feature space, the IFS algorithm computes the likelihood gain achieved by including the feature in the model. The feature that maximizes the gain is selected and added to the current model. This process is repeated until the gain from the best candidate feature only gives marginal improvement. In general, this process is very slow because it must re-compute the gain for every feature at each selection stage, and the computation of a parameter using Newton's method becomes expensive, considering that it must be repeated many times.

One improvement to the IFS method is the SGC algorithm (as described in U.S. Patent Application 2005/0021317), which can run hundreds to thousands of times faster than the original IFS algorithm without degrading classification performance. This allows finding high quality CME models quickly. The SGC algorithm only modifies those unnormalized conditional probabilities $\exp(\Sigma_j \lambda_j f_j(x,y))$ for (x, y) that satisfy $f_i(x, y)=1$, and subsequently adjusts the corresponding normalizing factors Z(x), when considering a feature $f_i$. A typical SGC implementation often uses a mapping table, which maps features to the training pairs (x,y). The SGC algorithm offers an improvement over IFS by using the gains computed in the previous step as approximate upper bounds for the subsequent steps. The gain for a feature needs to be re-computed only when the feature reaches the top of a list sorted in descending order by gain. This generally occurs when the feature is the top candidate for inclusion in the model. If the re-computed gain is smaller than that of the next candidate in the list, the feature is re-ranked according to its newly computed gain, and the feature now at the top of the list goes through the same gain re-computing process. This heuristic comes from evidence that the gains become smaller and smaller as more good features are added to the model. This can be explained by first assuming that the Maximum Likelihood (ML) estimation leads to the best model that reaches an ML value. The ML value is the upper bound. Since the gains need to be positive to proceed, the difference between the likelihood of the current and the ML value becomes progressively smaller. In general, practical applications have confirmed that the gains do not fluctuate very much as the model grows, and that there is typically no significant advantage in looking beyond the first element in the feature list.

Progressive Feature Selection

In general, the more contextual information that is used, the better a system performs. However, richer context can lead to combinatorial explosion of the feature space. When the feature space is huge (e.g., in the order of tens of millions of features or even more), the SGC algorithm usually exceeds the memory limitation on commonly available computing platforms with gigabytes of memory. To address the limitation of the SGC algorithm (and other machine learning algorithms as well), the learning algorithm 101 implements a progressive feature selection (PFS) method 104 that selects features in multiple rounds of SGC steps. The main idea of the PFS method is to split (i.e., divide or partition) the feature space into a plurality of tractable feature sets. An SGC or similar method is then performed on each one of feature sets to produce a number of feature subsets. The feature subsets are then merged (combined) to produce successively smaller feature set. This iterative splitting, feature selection, and merging process facilitates parallel processing of the initial feature space. That is, the use of dedicated processors or process flows on different partitions of features allows for the parallel processing of the entire feature space, thus allowing for maximum scalability of feature space processing.

In the merging step of the process, the features that feature selection process selects from different sub-spaces are merged into a smaller number of groups such that each of the groups can be processed by a single SGC algorithm or other feature selection algorithms and fewer groups need to be processed. Instead of re-generating the mapping table for each group from scratch, a new mapping table from the previous round's tables is created by collecting those entries that correspond to the selected features. Then, a feature selection method is performed on each of the feature groups and new features are selected from each of resulting sets. This process is repeated until a single final set of feature is selected.

Figure 2A:
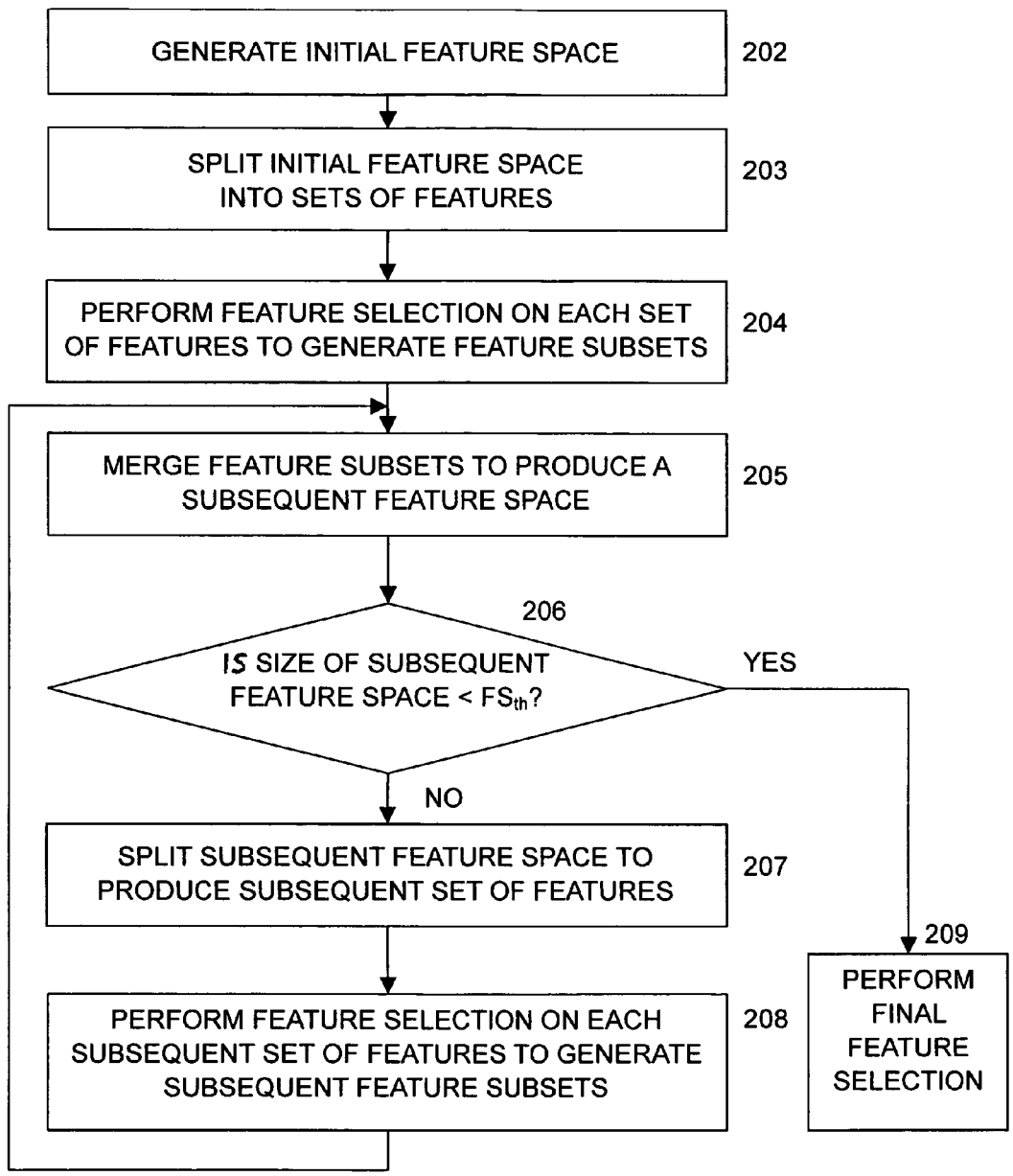
FIG. 2A is a flowchart that illustrates the steps of performing a progressive feature selection method, under an embodiment.

FIG. 2A is a flowchart that illustrates the general steps of performing a progressive feature selection method, under an embodiment. In step 202, an initial feature space is generated. This initial feature space is then split into a number of different feature sets, step 203. A feature selection process, such as SGC, is then performed on each feature set to select a subset of features from each set, step 204. It should be noted that the size of each feature set generated in step 203 must be less than or equal to maximum number of features that the feature selection process can handle, and is referred to as the threshold size ($FS_{th}$). Step 204 thus generates a number of feature subsets. These feature subsets are then merged together to produce a second (subsequent) feature space, step 205. If the size of the second (subsequent) feature space exceeds $FS_{th}$, which is checked in step 206, this feature space is then split into another number of different feature sets, which represent a subsequent set of features, step 207. A feature selection process is then performed on each of these feature sets to produce a second (subsequent) set of feature subsets, step 208. This split-select-merge operation is repeated until the combined size of the subsequent feature sets can be handled by the feature selection algorithms. Thus, as shown in FIG. 2A, in step 209, a final feature selection step is performed.

Figure 2B:
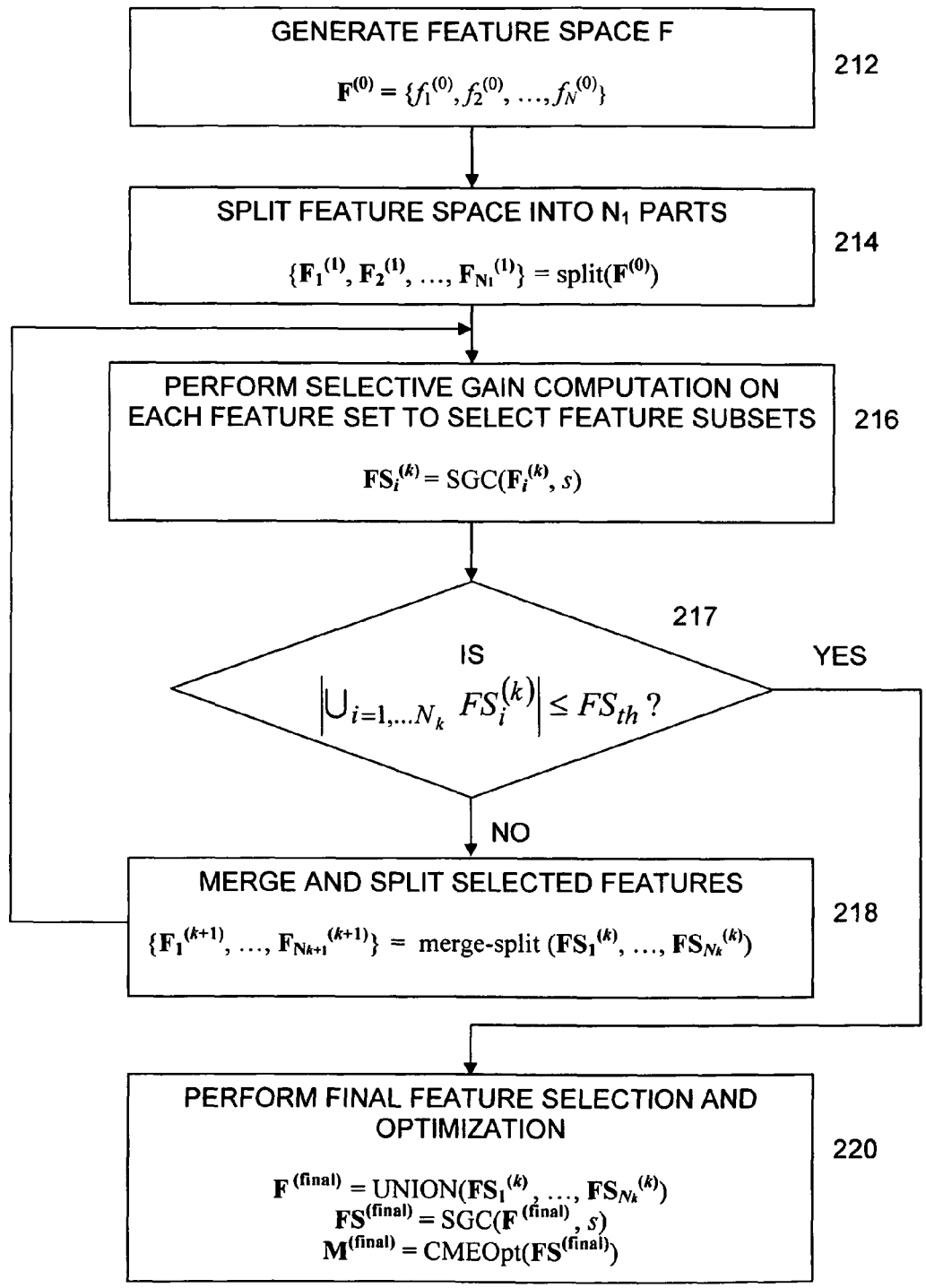
FIG. 2B is a flowchart for a method of performing a progressive feature selection, under another embodiment.

FIG. 2B is a flowchart that illustrates the steps of performing a progressive feature selection method, under another embodiment. In step 212, the initial feature space, $F^{(0)}$ is generated. This feature space is defined as: $F^{(0)} = \{f_1^{(0)}, f_2^{(0)}, \ldots, f_N^{(0)}\}$. The factor s represents the number of features that the feature selection algorithm generates. In one embodiment, the feature selection algorithm comprises the SGC method, although other methods can also be used. The initial feature space is then split into $N_1$ parts $\{F_1^{(1)}, F_2^{(1)}, \ldots, F_{N_1}^{(1)}\}$=split($F^{(0)}$), as shown in step 214. In step 216, for each feature space $F_i^{(k)}$, an SGC process (or similar feature selection method) is performed: $FS_i^{(k)}$=SGC($F_i^{(k)}$, s) to select a subset of features. If the number of features in the union of selected feature subsets exceeds the number of features that the feature selection algorithm can handle, i.e. $FS_{th}$, the selected feature subsets are then merged and split in step 218 using the following function: $\{F_1^{(k+1)}, \ldots, F_{Nk+1}^{(k+1)}\}$= merge-split ($FS_1^{(k)}, \ldots, FS_{Nk}^{(k)}$).

As shown in FIG. 2B, the SGC and merge-split steps are performed iteratively until $|\cup_{i=1,\ldots,N_k} FS_i^{(k)}| \leq FS_{th}$, that is, the size of the union of all selected feature subsets falls below $FS_{th}$. In one embodiment, the steps 216 and 218 are repeated as long as the size of the entire $F^{(k+1)}$ is too large to be handled by a single feature selection (e.g., SGC) operation as being tested in step 217. If the size is too large, it is split into smaller sets that can be handled individually until a final set that can be handled by itself is generated. At this point, a final feature set is produced, and in step 220, the process performs the final feature selection and optimization. This is accomplished by the functions: $F^{(final)}$=UNION($FS_1^{(k)}, \ldots, FS_{Nk}^{(k)}$), $FS^{(final)}$= SGC($F^{(final)}$, s) and $M^{(final)}$=CMEOpt($FS^{(final)}$) For the above equations, the function SGC( ) invokes the SGC algorithm, the function UNION( ) joins the specified feature spaces, and the function CMEOpt( ) optimizes feature weights.

Figure 3:
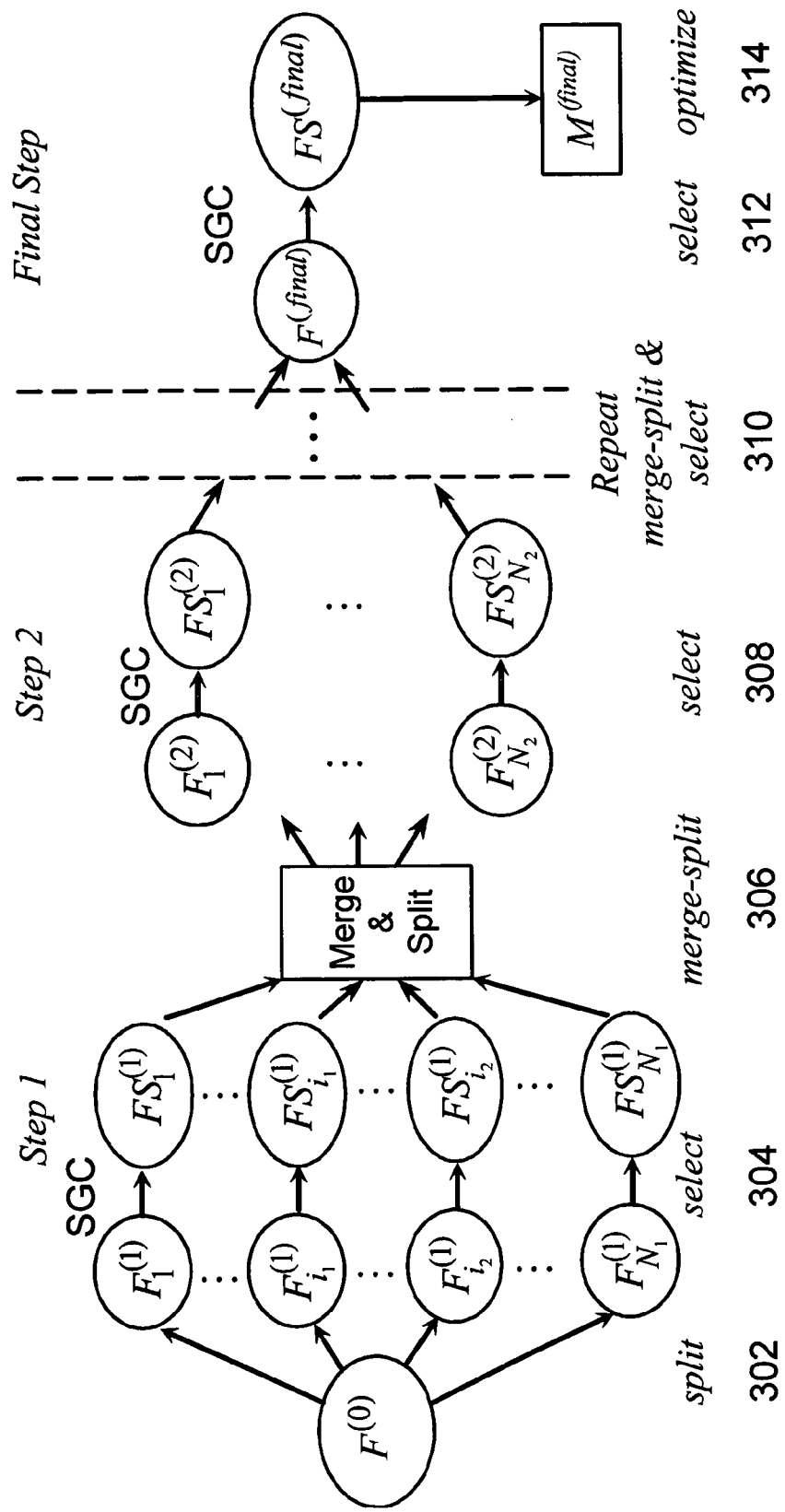
FIG. 3 is a graphic illustration of a progressive feature selection process executed on an ultra large feature set, under an embodiment.

FIG. 3 is a graphic illustration of a progressive feature selection process executed on an ultra large feature set, under an embodiment corresponding to the method illustrated in FIG. 2B. As shown in FIG. 3, a number of feature selection and merge-split operations are performed iteratively. The entire initial feature set, denoted $F^{(0)}$, which can contain millions to billions of features is split 302 into a first set of $N_1$ feature sets denoted feature sets $F_1^{(1)}, F_2^{(1)}, \ldots, F_{N_1}^{(1)}$. Each of the $N_1$ feature sets is then reduced by a feature selection operation 304, such as an SGC operation, so that a first subset of each first feature set is selected. As shown in FIG. 3, the first subsets are denoted $FS_1^{(1)}, FS_2^{(1)}, \ldots, FS_{N_1}^{(1)}$. The first split into feature sets $F_1^{(1)}, F_2^{(1)}, \ldots, F_{N_1}^{(1)}$, and the selection of subsets for each these feature set is denoted as "Step 1" of the PFS method. Step 1 concludes with a merge-split operation 306 in which the selected first subsets are merged to form a second set of feature sets. The merged second set of features are then split to form a second set of $N_2$ feature sets denoted $F_1^{(2)}, F_2^{(2)}, \ldots, F_{N_2}^{(2)}$. Step 2 then starts with a feature selection operation 308 that is then performed on each of the second feature sets to select subsets of the second set features. As shown in FIG. 3, the second subsets are denoted $FS_1^{(2)}, FS_2^{(2)}, \ldots, FS_{N_2}^{(2)}$. A number of the selected second subsets are then merged and split in 310 to form a third set of feature sets from which feature subsets are selected. Successive merge-split and selection operations are performed in subsequent steps so that this sequence is repeated until a final set of features denoted $F^{(final)}$ is produced. From this final feature set, a subset $FS^{(final)}$ is selected by a final SGC operation 312. This subset comprises the final set of features that are then optimized 314 to produce properly weighted final features, denoted $M^{(final)}$.

In one embodiment, the size of each subsequent feature set produced by the merging of previous feature subsets is selected to conform to a size compatible with the feature selection algorithm used to produce the next subset of features. The number of iterative steps comprising the selection and merging operations generally depends on the size of the original feature space $F^{(0)}$, as well as the resources of the computing system, such as memory, processing power, and so on.

As illustrated in FIG. 3, the original feature space is initially split into a number of different feature sets, these feature sets are then each processed by a feature selection algorithm to produce a number of feature subsets. The feature subsets are then processed by a merge-split function to generate a subsequent number of feature sets. If the initial feature space is thought of as a merged set, it can be seen from FIG. 3 that the entire PFS method comprises a number of merge-split-select operations performed on a successively smaller number of features.

With regard to the feature selection process that generates the feature subsets, for the embodiments illustrated in FIGS. 2A, 2B, and 3, selection of the subset of features from a previous feature set utilizes the SGC method. Alternatively, other Maximum Entropy or conditional probability techniques, such as IFS, IIS (Improved Iterative Scaling), and boosting can be used to select each successive subset of features from a previous feature sets.

With regard to the merge-split process that generates the subsequent feature sets, various different split and merge strategies can be employed. The merge and split steps can be separate and discrete steps as shown in FIG. 2A, or they can be combined to form, in effect, a single step, as shown in FIG. 2B. Thus, in one embodiment, the merge-split function (merge-split( )) comprises two distinct operations merge( ) and split( ) that are combined to generate subsequent feature sets. In general, there are three ways to perform the merge operation. In the first method, a number of sequential sets of feature subsets are combined so that each resulting new feature set is of a size that the feature selection algorithm can handle. In the second method, sets of feature subsets are randomly selected to be merged with one another in a manner such that each resulting new feature set is of a size that the feature selection algorithm can handle. In the third method, all of the feature subsets are merged together and then the merged subsets are split into a number of subsequent feature sets, each of a size that accommodates the feature selection algorithm. In the first and second methods, the splitting operation is effectively implicit (leading to a combined merge-split operation), whereas in the third method, an explicit splitting operation is performed (leading to separate merge, split steps).

In one embodiment, two different types of splitting methods can be used to generate a subsequent set of feature sets after a merge operation. These two methods are a random split strategy, and a dimension-based split strategy. In the random split strategy, a feature space is randomly split into a number of disjoint subspaces. An equal number of features is selected for each new feature set. In the dimension-based split strategy, a feature space is split into disjoint subspaces based on feature dimension/variables. The number of features for each new feature set is determined on the basis of certain distributions. The dimensions can be any appropriate characteristic common to a significant number of features within the feature space. For example, in a natural language processing application, the dimension for spoken input can be word-based, POS Tag-based, prosody-based, and so on. In the case of dimension-based split, the number of features selected for each dimension can be determined in one of two ways: Uniform and Prior. When the split is Uniform, the same number of features is selected for each dimension. When the split is Prior, the number of features to be selected in each dimension is determined in proportion to the importance of each dimension.

The initial splitting of the feature space $F^{(0)}$, can be accomplished by either the random or dimension based method, or it can be accomplished by simply splitting the feature space into $N_1$ different feature sets each of which is of a size that can be handled by the feature selection algorithm.

Feature Generation

The initial feature space can be any number of features related to an application. As stated previously, larger feature spaces tend to give better results for most statistical modeling systems. The PFS method allows the selection of features from a virtually unlimited size feature space. In one embodiment, the learning algorithm 101 that includes the PFS system incorporates a feature generation module 103 that generates the number of features in the initial feature space. For the embodiment illustrated in FIG. 1, the feature generation module includes a combiner process 120 that combines any number of features in the initial feature space to increase the total number of features. In general, the addition of combination of features along with the original features provides much richer information as represented by the combination of different variables.

In one embodiment, the combiner process 120 comprises a logic and/or arithmetic combinatorial unit that combines features using known or user-defined logic rules or arithmetic operations. The logic rules can include the standard logic operations of AND, OR, XAND, XOR, and so on. The arithmetic operations can include the standard arithmetic operators +, −, *, and /. Using the combiner element 120 of the feature generation module 103, the initial feature space can be defined as $F^{(0)} = \{f_1^{(0)}, f_2^{(0)}, \ldots, f_N^{(0)}\} + \text{logic}(f_1^{(0)}, f_2^{(0)}, \ldots, f_N^{(0)}) + \text{arithmetic}(f_1^{(0)}, f_2^{(0)}, \ldots, f_N^{(0)})$. The function logic( ) represents all possible logic operations among the initial features, and the function arithmetic( ) represents all possible arithmetic operations among the initial features. In addition, any predefined combination rules may also be applied depending upon the application and system requirements.

An example of an expanded feature space using the combiner process may be as follows: $F^{(0)} = \{(f_1^{(0)}, f_2^{(0)}, \ldots, f_N^{(0)}) (f_1^{(0)} \text{ AND } f_2^{(0)}, f_1^{(0)} \text{ OR } f_2^{(0)}, f_2^{(0)} \text{ AND } f_3^{(0)}, f_2^{(0)} \text{ OR } f_3^{(0)} \ldots) + (f_5^{(0)} * f_6^{(0)}, f_5^{(0)} - f_6^{(0)} \ldots)\}$. As can be seen from this example, any number of different logic and/or arithmetic operations can be used to expand the initial feature by a combinatorial expansion factor over the original feature space comprising the individual features. Additional feature combinations can be provided by any proprietary rules that are defined by the user or system in accordance with the application and/or learning algorithm.

Disfluency Detection Application

In an embodiment in which the machine learning system 100 is a natural language processing-based system, the application 110 can comprise a natural language processing (e.g., spoken dialog system) module that takes in acoustic signals comprising the user's spoken words from a microphone or microphone array and outputs a sequence or a lattice of words through an output device, such as a speaker (audio output) or graphics display (video output) or performs one or more actions on other devices such as navigation, music player, temperature controller, etc. In one typical step, the natural language processing module produces a structured meaning representation, based on a statistical model trained on in-domain linguistic data through a learning process 101 and the available training data 102. Natural language processing represents an example of an application with a potentially very large feature space.

One significant application in the field of natural language processing is disfluency detection. In spoken utterances, disfluencies, such as self-editing, pauses and repairs, are common phenomena. Based on known conventions, a disfluent spoken utterance can be divided into three parts: the reparandum, the part that is repaired; the interregnum, which can be either empty or fillers; and the repair/repeat, the part that replaces or repeats the reparandum. The first two parts combined are called an edit or edit region. In the example sentence: "It is, you know, this is a big problem." The phrase "It is" is the reparandum, "you know" is the interregnum, and "this is" is the repair. In such an example, studies have shown that improved edit region detection leads to better parsing accuracy in a typical natural language processor. The ability to explore a much larger feature spaces for disfluency detection, such as features for prosody, confidence scores, and various feature combinations can further greatly improves disfluency detection. In general, the features are grouped according to variables, which essentially define feature subspaces.

For a natural language processing system, the categories can include words, POS tags, partial word flags, hierarchical POS rough copy, word rough copy, distance, and prosody information. FIG. 4 is a table that lists a number of possible variables used in a natural language processing system that utilizes a PFS method, under an embodiment. As shown in Table 400, a names and descriptions for a number of example features associated with each category are provided. FIG. 4 is intended to provide an example of possible variables used to define an initial feature space for a disfluency detection task, and it should be noted that many other variables could also be used.

With reference to the variables listed in table 400, any number of variables can be combined to increase the feature space and provide a richer context. FIG. 5 is a table that lists a number of possible variable combinations for the variables of FIG. 4, under an embodiment. Column 502 of table 500 lists the categories and combinations among the combined categories, and column 504 provides a short description of the combination. An example number of combinations for each category is provided in column 506. FIG. 5 is intended to provide an example of possible variable combinations used to expand an initial feature space for a disfluency detection task, and it should be noted that many other combinations of variables could also be used.

These variables listed in Table 400 can be used as the basis of the dimension-based split strategy employed by the PFS method. FIG. 6 is a table that illustrates possible dimensions for an example of a natural language processing system, under an embodiment. Table 600 illustrates the dimensions based on these categories that can be used in a dimension-based split strategy for a PFS method. Column 602 lists the categories, such as Words, POS Tags, Rough Copy, and Prosody; and column 604 lists the features associated with each category.

The tables illustrated in FIGS. 4, 5, and 6 are intended to examples of a particular application (i.e., disfluency detection in natural language processing). It should be noted that many different types of variable definitions and dimensions can be defined for any other application utilizing a PFS method.

The progressive feature selection method generally facilitates the processing of a great number of variables and combinations of variables over present feature selection techniques, such as incremental feature selection. The ability to process a larger number of features generally leads to overall performance improvements.

Embodiments of a progressive feature selection method for use in an intelligent human-machine interaction system, or a machine learning system, etc. as described herein can be used in various different applications, industries or industry segments, such as automobiles, airplanes, hand-held devices, cell-phones, and the like. One embodiment of such a system may be a dialog system that can be speech-based with user input and system output provided as spoken language, or it can be text-based with alphanumeric text input and output through a computing device or similar interface device.

Aspects of the progressive feature selection method described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the content optimizer include: microcontrollers with memory (such as EEPROM), embedded microprocessors, firmware, software, etc. Furthermore, aspects of the progressive feature selection method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Such computer-readable media comprises non-volatile storage media in various forms (e.g., optical, magnetic or semiconductor storage media).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the progressive feature selection method is not intended to be exhaustive or to limit the embodiments to the precise form or instructions disclosed. While specific embodiments of, and examples for, progressive feature selection in dialog systems or other human-machine interaction systems, or machine learning systems are described herein for illustrative purposes, various equivalent modifications are possible within the scope of the progressive feature selection method, as those skilled in the relevant art will recognize.

The elements and acts of the various embodiments described above can be combined to provide further embodiments. These and other changes can be made to the progressive feature selection method in light of the above detailed description.

In general, in the following claims, the terms used should not be construed to limit the progressive feature selection method to the specific embodiments disclosed in the specification and the claims, but should be construed to include all operations or processes that operate under the claims. Accordingly, the progressive feature selection method is not limited by the disclosure, but instead the scope of the recited method is to be determined entirely by the claims.

While certain aspects of the progressive feature selection method are presented below in certain claim forms, the inventor contemplates the various aspects of the methodology in any number of claim forms. For example, while only one aspect may be recited as embodied in machine-readable medium, other aspects may likewise be embodied in machine-readable medium. Accordingly, the inventors reserve the right to add additional claims after filing the application to pursue such additional claim forms for other aspects.

What is claimed is:

1. A computer-implemented method of selecting an optimum feature subset from an initial feature set comprising executing program code in a processor, the code performing the acts of:

splitting the initial feature space into a plurality of first feature sets in a feature space definition computing component of the processor executing at least a portion of the program code, wherein the feature space definition computing component uses a dimension-based split strategy that splits the initial feature space into a plurality of disjoint feature sets, each feature set based on a feature dimension for the spoken input, wherein the feature dimensions comprise word, word position, speech tagger, and prosody characteristics, and further wherein the number of features in each feature set is defined in proportion to a relative importance of the respective dimension in a natural language processing application;

performing a feature selection process in a feature selection component of the processor executing at least another portion of the program code to select a subset of features from each of the plurality of first feature sets to produce a plurality of second feature sets, the feature selection process having a threshold size indicating a maximum number of features that can be accommodated;

performing a merge-split operation in the feature selection component using the dimension-based split strategy on numbers of the second feature sets to produce a plurality of third feature sets, wherein the merge-split operation includes merging the numbers of the second feature sets together to form a combined set, verifying that the size of combined set is less than or equal to the threshold size, and splitting the combined set into the plurality of third feature sets if the combined set size exceeds the threshold size;

selecting, through the feature selection process, a subset of features from each of the plurality of third feature sets to produce a plurality of fourth feature sets; and continuing the merge-split and selecting steps on successive feature sets until a final feature set is selected.

2. The method of claim 1, wherein the feature selection method is selected from one of: a Selective Gain Computation process, an Incremental Feature Selection process, an Improved Iterative Scaling process, and a boosting process.

3. The method of claim 1, wherein the merge-split operation comprises one of: merging sequential sets of the second feature sets into the plurality of third feature sets, and merging random sets of the second feature sets into the plurality of third feature sets.

4. The method of claim 1, wherein the merge-split operation comprises merging all of the second feature sets into a second feature space comprising all of the third feature sets, and splitting the second feature space into the plurality of third feature sets.

5. The method of claim 1, wherein the merge-split operation comprises one of: randomly selecting the feature sets from a previous set of features, and defining one or more feature categories and selecting the feature sets from the previous set of features based on the feature categories.

6. The method of claim 1, further comprising combining a number of features of the initial feature space using one or more operations to increase the initial feature space.

7. The method of claim 6, wherein the one or more operations comprises at least one of: a logic operation, an arithmetic operation, and a user-defined combinatorial operation.

8. A system for selecting an optimum feature subset from an initial feature set, the system comprising one or more processor elements comprising:

first hardware circuit means for splitting the initial feature space into a plurality of first feature sets using a dimension-based split strategy that splits the initial feature space into a plurality of disjoint feature sets, each feature set based on a feature dimension for the spoken input, wherein the feature dimensions comprise word, word position, speech tagger, and prosody characteristics, and further wherein the number of features in each feature set is defined in proportion to a relative importance of the respective dimension in a natural language processing application;

feature selection hardware means for selecting a subset of features from each of the plurality of first feature sets to produce a plurality of second feature sets, the feature selection means having a threshold size indicating a maximum number of features that can be accommodated;

second hardware circuit means for performing a merge-split operation on numbers of the second feature sets to produce a plurality of third feature sets, wherein the merge-split operation includes merging the numbers of the second feature sets together to form a combined set, verifying that the size of combined set is less than or equal to the threshold size, and splitting the combined set into the plurality of third feature sets if the combined set size exceeds the threshold size; and third hardware circuit means for selecting a subset of features from each of the plurality of third feature sets to produce a plurality of fourth feature sets and continuing a merging and selecting operation on successive feature sets until a final feature set is selected.

9. The system of claim 8, wherein the feature selection hardware means includes one of: a Selective Gain Computation process, an Incremental Feature Selection process, an Improved Iterative Scaling process, and a boosting process.

10. The system of claim 8, wherein the merge-split operation comprises means for merging numbers of the second feature sets comprises one of: merging sequential sets of the second feature sets, merging random sets of the second feature sets, and merging all of the second feature sets into a second feature space comprising all of the third feature sets.

11. The system of claim 10 wherein the hardware means for performing the merge-split operation further comprises means for splitting the second feature space into the plurality of third feature sets, and wherein the means for splitting the second feature space comprises one of: randomly selecting the feature sets from a previous set of features, and defining one or more feature categories and selecting the feature sets from the previous set of features based on the feature categories.

12. The system of claim 8, further comprising hardware means for combining a number of features of the initial feature space using one or more operations to increase the initial feature space, wherein the operations comprise one of: a logic operation and an arithmetic operation.

13. The system of claim 8, wherein the optimum feature set relates to a model for an application used in a human-machine interaction system.

14. A non-transitory machine-readable medium including instructions which when executed in a processing system select an optimum feature subset from an initial feature set comprising:
    splitting the initial feature space into a plurality of first feature sets using a dimension-based split strategy that splits the initial feature space into a plurality of disjoint feature sets, each feature set based on a feature dimension for the spoken input, wherein the feature dimensions comprise word, word position, speech tagger, and prosody characteristics, and further wherein the number of features in each feature set is defined in proportion to a relative importance of the respective dimension in a natural language processing application;
    performing a feature selection process to select a subset of features from each of the plurality of first feature sets to produce a plurality of second feature sets, the feature selection process having a threshold size indicating a maximum number of features that can be accommodated;
    performing a merge-split operation using the dimension-based split strategy on numbers of the second feature sets to produce a plurality of third feature sets, wherein the merge-split operation includes merging the numbers of the second feature sets together to form a combined set, verifying that the size of combined set is less than or equal to the threshold size, and splitting the combined set into the plurality of third feature sets if the combined set size exceeds the threshold size;
    selecting, through the feature selection process, a subset of features from each of the plurality of third feature sets to produce a plurality of fourth feature sets; and
    continuing the merge-split and selecting steps on successive feature sets until a final feature set is selected.

15. The non-transitory medium of claim 14, wherein the feature selection method is selected from one of: a Selective Gain Computation process, an Incremental Feature Selection process, an Improved Iterative Scaling process, and a boosting process.

16. The non-transitory medium of claim 14, wherein the step of selecting a subset of features comprises randomly selecting the subset of features from a previous set of features.

17. The non-transitory medium of claim 14, further comprising combining a number of features of the initial feature space using one or more operations to increase the initial feature space, wherein the operations comprise one of: a logic operation, and an arithmetic operation.

* * * * *